Jan. 5, 1965 J. M. HOWES 3,164,417
DRIVE MEANS FOR ENDLESS-BELT UNITS
Filed March 6, 1963 2 Sheets-Sheet 1
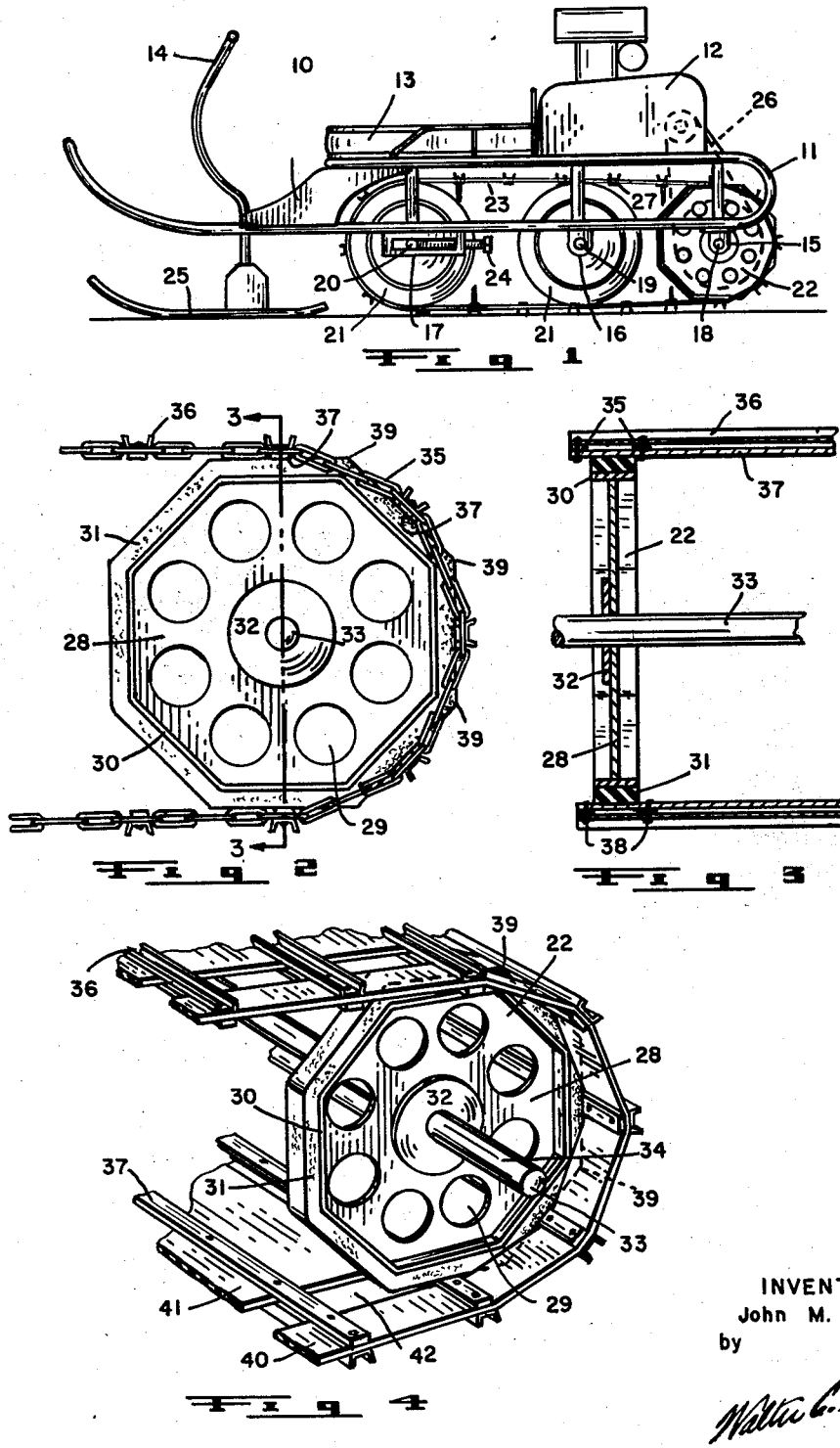
INVENTOR
John M. Howes
by
Agent Jan. 5, 1965　　　J. M. HOWES　　　3,164,417
DRIVE MEANS FOR ENDLESS-BELT UNITS
Filed March 6, 1963　　　2 Sheets-Sheet 2
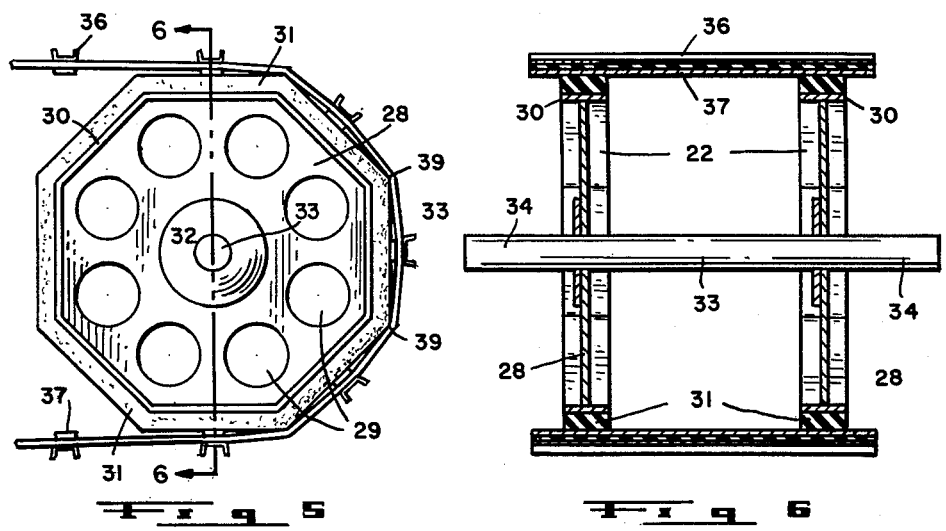
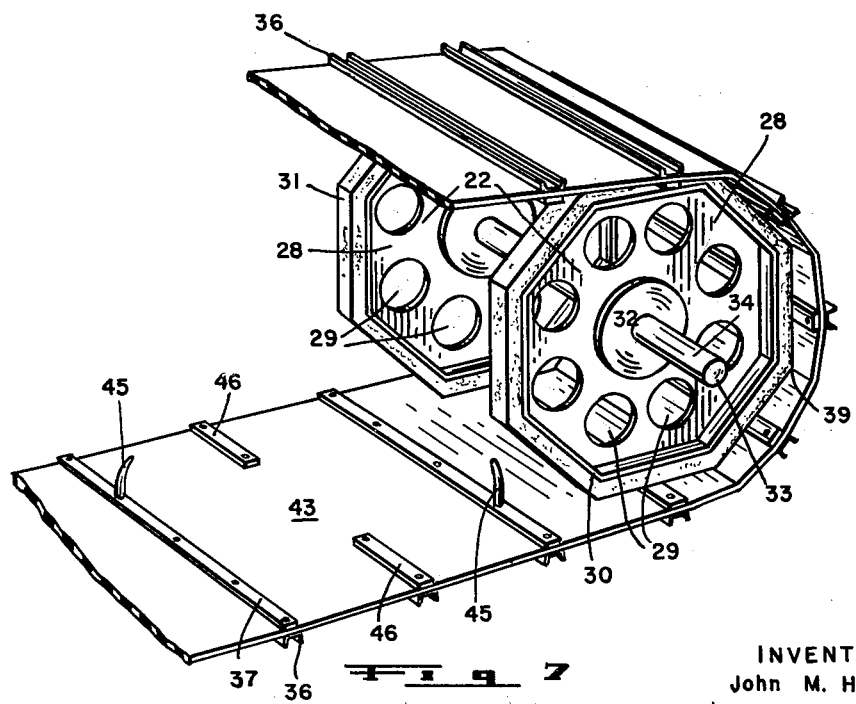
INVENTOR
John M. Howes
by
*Walter C. Boggis*
Agent United States Patent Office 3,164,417
Patented Jan. 5, 1965

3,164,417
DRIVE MEANS FOR ENDLESS-BELT UNITS
John M. Howes, Star Rte. #4, Box 312, Hibbing, Minn.
Filed Mar. 6, 1963, Ser. No. 263,295
5 Claims. (Cl. 305—32)

The endless-belt type of wheeled drive for operating tractors, trucks, snow vehicles, and the like, over relatively soft terrane, such as muskeg or snow, is well known and used extensively. It is also well known to drive such endless-belts through polygon-shaped drive wheels, when said endless-belts are in the form of pivoted links, which can wrap around and conform to the flat sides of the polygon. In such drives, the pivot points of the links must be standard distances apart, so they can register with the corners, formed by the meeting sides of the polygon, or such drives will not work. If one of the links of such an endless-belt should break, the drive is useless, until a proper link replaces the broken one.

The principal object of the present invention is to provide a wheeled drive unit for vehicles, operable by endless belting, driven through one or more polygon-shaped drive wheels, and such that said belting is not critically related to the lengths of the sides of the polygon drive wheels, so manufacturing costs can be reduced, and simple temporary repairs made on the road.

Further objects of the invention are: to provide means whereby the endless belting of said unit can be either chain linkage or flexible sheeting; to provide spaced cross members along the belting for reinforcement thereto and traction grip; that a plurality of endless-belts can be used in spaced relation, with polygon-shaped drive wheels therebetween; or a single endless-belt of flexible sheet material can be used completely over the unit, with one or a series of spaced polygon-shaped driving wheels therein, to support and drive said belting.

A further object of the invention is to provide a very simple construction for the polygon-shaped driving wheels, to reduce their manufacturing cost, simplify unit assembly, and provide strong efficient operation for the endless belting.

A still further object of the invention is to utilize the vibration caused by the operating polygon-shaped drive wheels against the belting, to break up mud, debris, snow or ice, and prevent same from building up on the unit.

With the above important, and other minor objects in view, which will become more apparent as the description proceeds, the invention consists essentially in the design, construction, and assembly of the various parts hereinafter more particularly described, reference being had to the accompanying drawings, wherein like characters of reference indicate corresponding parts in the several figures, and wherein:

FIGURE 1 is a side view of a snow vehicle, powered with an endless-belt drive.

FIGURE 2 is a side view of the octagon-shaped drive wheel shown in FIGURE 1, and showing the connection of same to the endless belting.

FIGURE 3 is a partial section taken on the line 3—3 of FIGURE 2.

FIGURE 4 is a perspective view of an octagonal drive wheel, operating with a plural belting arrangement.

FIGURE 5 is a view similar to FIGURE 2, but showing a single endless belting over the wheels.

FIGURE 6 is a vertical sectional view taken on the line 6—6 of FIGURE 5.

FIGURE 7 is a perspective view of the construction shown in FIGURES 5 and 6.

A snow vehicle 10 is shown in side view in FIGURE 1. A tubular framework 11 is provided across and on each side of the machine, and supports an upper rear motor 12 and a seat 13, on which the driver sits to operate a steering control 14. The lower parts of the framework sides are provided with rear bearings 15 and 16, while belt-tightening bearings 17 are carried at the front. These bearings all rotatably receive cross shafts 18, 19 and 20 respectively. The shafts 19 and 20, at each end thereof, carry pneumatic tired wheels 21 which support the framework, while the rear shaft 18 carries a polygon-shaped drive wheel 22 at each end thereof, for operating an endless belting 23, which also passes around the front wheels 21. This endless belting can be tightened by set screws 24 in the bearings 17. The front end of the machine is supported on skis 25, which can be steered by the control 14, when the endless belting is driven by the motor 12, through the drive indicated at 26. The above description is general snowmobile design.

By observing FIGURE 1 it will be seen that the support wheels 21, polygon drive wheels 22 and the endless belting 23, when mounted in the framework as explained, form a wheeled drive unit for the vehicle. It will also be noted that the endless belting is provided with a series of spaced cross members 27 therearound, for reinforcement of the belting and to provide a traction ground grip at intervals therealong. As mentioned in the preamble, it is known to use polygon-shaped driving wheels for endless belting, when said belting is in the form of hinged links or chain, and same can snugly wrap around said polygon-shape, with the hinges at the polygon corners.

In the present disclosure, the drive wheels 22 consist of octagon-shaped plates 28, although hexagon or heptagon shaped wheels could be used. These octagon plates each have a circular ring of holes 29 therethrough, to reduce weight. A band, or strap, 30 is wrapped around the periphery of the plate, and welded thereto, to form an octagonal flange therearound. A solid rubber tire 31 is then vulcanized to this flange, to form a resilient octagonal-shaped tread thereover. A reinforcing disc 32 is centrally welded to each of the plates 28, and on one side thereof. A central hole is drilled through both the plate and the disc, to receive a shaft 33 therethrough. In the present instance (note FIGURE 6), two octagonal wheels as above described are provided side by side, in spaced relation, and this latter shaft passes through both, and is welded to each. It will also be noted that the shaft extends outwardly on either side of the two wheels, as shown at 34, to later be received in the framework bearings 15. The other bearings receive their shafts in the same manner, and accordingly the framework extends, and is supported, completely over the wheels.

By observing FIGURES 2 and 3, it will be seen that a pair of chains 35 are provided on each side of the drive wheel 22. A similar pair of chains (not shown) are provided on the opposite drive wheel at the other side of the vehicle. Every fourth link of these chains receive opposite ends of an outer channel-shaped cross bar 36, and an inner flat cross bar 37, the links being received therebetween, and both being riveted together through said links, as shown at 38. The bars 36 and 37 connect and complete both sets of chains into a belting across the vehicle, and they also form the reinforcing grips, shown at 27 in FIGURE 1.

By closely observing the chain linkage in FIGURE 2, it will be seen that the bars 37 come to rest on the flat faces of the rubber tread 31, while the chain links between pass along each side of the drive wheel, to the next bar 37 on the next flat face, while the rubber corners 39 of the tread project therebetween, like the tooth of a gear or sprocket. Accordingly, when the octagonal-shaped drive wheels are rotated, the bars 37 can rest anywhere on the rubber treads, between the corners 39, and the spacing therebetween is not critical to the spacing between the corners 39, although the belt tightener bolts or screws 24 will ensure a tight belting.

This lack of critical spacing is very advantageous for quick simple repairs on the road, instead of putting the vehicle out of action, as would occur with the other belting mentioned. If a chain link should break under this new construction, the linkage can be qucikly reconnected again with wire, or the like. As the grip spacing is not critical, the belting can be again power operated to drive the vehicle, until a permanent repair can be effected.

Another valuable advantage for this type of drive is that should an extra heavy load be carried by the vehicle, the grips 27 will be inclined to creep along the flat rubber faces of the drive wheel treads, due to the extra power being applied to the shaft 33 to turn the drive wheels. As these grips advance toward the corners 39 of the drive treads, the pneumatic tires of the front support wheels will be compressed by the grips thereon, and so permit said creeping. This phenomena can be used to advantage, as a safety check against the load. If the load is too heavy, the grips will slip past the corners 39. It is therefore obvious, that the amount of the maximum load to be carried can be set by the air pressure in the tires of the front wheels. Such slipping will also form a protection against damage to the wheeled drive unit, if the chains should become entangled with an immovable object.

FIGURE 4 shows the use of spaced belts 40 and 41 in place of the chains, and it will be noticed, they operate around the drive wheels 22 in the same manner as shown for the chains in FIGURES 2 and 3. In this arrangement, the outer belts 40 are relatively narrow, while the inner belt 41 will extend completely across the spacing between the drive wheels, and the front support wheels will track over the bars 37, at the belt spacings 42. Obviously, if desired, a single drive wheel could be separately driven on each side of a machine, and each drive wheel can operate a pair of similar narrow belts 40 and 41 over pneumatic wheels ahead, in the same arrangement as the chains. It will be observed in FIGURES 2 and 4 that the octagon-shaped drive wheels have their pointed corners 39 projecting between the chains or belts, at the belt spacing 42. This will automatically maintain the belting on the front support wheels.

In FIGURES 5, 6 and 7, a single wide endless-belt 43 covers both the support wheels and the drive wheels. In this arrangement, the bars 37 extend right across the belt, and their ends ride the flat rubber treads of the drive wheels in the same manner, but the rubber belt 43, between the bars 37 wraps around the rubber corners 39 of the drive wheels, creating an outwardly projecting ridge 44 thereacross, at said rubber corners, as the belt passes around the drive wheels. In other words; there is no spacing of belts, such as shown at 42 in FIGURE 4. The bars 37 however can still creep along the flat faces of the rubber tread, toward the corners 39, and the formed ridges 44, when extra power is applied. When they meet the ridges, the bars slip past the corners, permitting the ridges to start again. In doing so, the belting 42 will tighten the bars 37 to compress the tires of the front support wheels, in the same manner as for the chains and multiple belts shown in the other figures.

The above single belt construction shows a further modified method of drive, and is just as efficient as that shown for the constructions in FIGURES 2, 3 and 4, and the pressure in the front wheel tires can still be used to establish the maximum carrying load. It might be mentioned however, that in order to keep the belting properly positioned on the drive wheels and support wheels, alternated curved prongs 45 project inwardly of the belting, from every second cross bar 37. When the belting is operated by the drive wheels, the front wheel tires side contact these curved prongs, to constantly press the belting into position as the wheels pass over the bars. If desired, short bars 46 can be used on each side of the belting, inbetween the prong support bars, as shown in FIGURE 7. This gives a maximum number of bars for the wheels to ride over, satisfactory fastening for the cross channel-shaped bars 36, and a saving in metal.

From the above disclosure it will be appreciated that I have designed a novel drive for endless belting with a polygon-shaped wheel which results in a kind of resilient thrust, rather than a positive one, the drive actually resulting in slippage when the carrying load exceeds the weight set by the tire pressure of the front support wheels. Further, due to the polygon-shape of the drive wheels, the drive is a vibratory one, and the vibrations are taken advantage of to break up and throw off mud, debris, snow or ice which might tend to collect on the driving unit.

In summing up, it will be seen from the disclosure, that chains 35 can be used on each side of the wheels 22 (FIGURES 2 and 3) for the driving purposes. Rubber belts can be used in the same manner, as shown in FIGURE 4. If desired, three spaced belts can be used in this latter way to cover the wheeled drive unit, the center belt being a wide one. In each arrangement, the chains or belts are connected by the grip bars 27 to provide reinforcement and good traction. Or, a single wide belting can be employed, as shown in FIGURES 5, 6 and 7, which gives wonderful support on relatively soft material, and with the same efficiency. By observing FIGURE 7, it can be seen that any number of drive wheels 22 can be used on the drive shaft for operation of the belting, and if the machine is built extra wide, two belts 43 could be used, in spaced relation, but with one drive shaft through the drive wheels, so an extra bearing can be provided on said shaft, at the belt spacing, for a central support of the vehicle framework.

While I have shown an octagon-shaped drive wheel 22 in the drawings, I wish it to be understood that hexagon and heptagon drive wheels can also be employed for the same purpose, and with good results. The only difference is that the hexagon wheels cause heavier vibration to shake and break up the various ground formations mentioned, and reduces the riding qualities. I have actually found that the six, seven and eight sided group of drive wheels are the most satisfactory for the purpose, as a pentagon drive wheel creates too much vibration for satisfactory riding qualities and the nonegan-shape comes too close to a circle, and so permits too much slippage of the belting.

What I claim as my invention is:

1. A drive for endless-belt units, comprising: a wheel rotatably mounted on a framework to support same; a polygon-shaped drive wheel having flat peripheral faces, rotatably mounted on said framework, aligned with and in spaced relation from said support wheel; a flexible endless belting encircling said wheels, for rotation of the support wheel by the drive wheel through said belting; bars secured across the inner face of the endless belting, in spaced relationship therealong and for contact with the support wheel in the movement of the belting therearound; and said bars positioned for variable contact on the flat faces of the drive wheel and to space the belting therefrom in the movement of the belting around the drive wheel.

2. A drive for endless-belt units, comprising: a support wheel rotatably mounted in a framework; a pneumatic tire mounted on said support wheel; a polygon-shaped drive wheel having flat peripheral faces, rotatably mounted in said framework in alignment with said support wheel and in spaced relation therefrom; a flexible endless belting encircling said wheels, forming a track for same to ride on and operable by the drive wheel to rotate the support wheel thereby; reinforcing bars secured to the inner face of said belting, crossing same at spaced intervals therealong and contacting the pneumatic tire tread of the support wheel in the movement of the belting therearound; and said bars resiliently contactable with the flat faces of the drive wheel, by the air pressure in said pneumatic tire acting on said belting, to space the belting therefrom at the positions of the bars around the drive wheel and to drive the belting in the rotation of the drive wheel.

3. A drive for endless-belt units, comprising: a wheel rotatably mounted in a framework to support same; a polygon-shaped drive wheel having flat peripheral faces, rotatably mounted in said framework in alignment with said support wheel and in spaced relation therefrom; a pair of spaced flexible endless belts encircling said wheels, one on each side thereof; reinforcing bars secured to and connecting said belts at spaced intervals therealong to form a belting and provide a track for the wheels to ride on; said bars contactable with the flat faces of the drive wheel to support and space said belting therefrom as same pass around the drive wheel, and to drive the belting for rotation of the support wheel thereby in the rotation of the drive wheel; and adjustable means on said framework for moving the support wheel in relation to the drive wheel, to tighten and loosen the belting on the wheels.

4. A drive for endless-belt units, comprising: a support wheel rotatably mounted on a framework; a pneumatic tire mounted on said support wheel, a polygon-shaped drive wheel having flat peripheral faces, rotatably mounted on said framework in alignment with said support wheel and in spaced relation therefrom; a pair of spaced endless chains encircling said wheels, one on each side thereof; cross bars secured to and connecting said chains at spaced intervals therealong to form a belting and provide a track for the wheels to ride on; said bars frictionally and resiliently contactable with the flat faces of the drive wheel by the air pressure in said pneumatic tire acting through said chains, and with the connecting chain links thereof spaced apart by the drive wheel corners to drive said belting and rotate the support wheel thereby in the turning of said drive wheel.

5. A drive for endless-belt units, comprising: a pair of wheels positioned side by side in spaced relation and rotatably mounted on a framework to support said framework; pneumatic tires mounted on said support wheels; a pair of polygon-shaped drive wheels each having flat peripheral faces, between the corners, rotatably mounted side by side and in spaced relation on said framework, each in alignment with and in spaced relation from one of said support wheels and both driven by a connecting shaft; a flexible endless belting completely enclosing said wheels to provide an endless track for the wheels thereon and to rotate the support wheels by the drive wheels when said drive wheels are rotated; reinforcing bars secured to the inner face of and crossing said belting at spaced intervals therealong; said bars contacting the tire tread of the support wheels in passing therearound with the belting; said bars contactable with the flat faces of the drive wheels by the air pressure in said pneumatic tires acting through said belting, to space the belting therefrom at the bars and to drive the belting for rotation of the support wheels thereby; adjustable means on said framework for moving the support wheels thereon to tighten and loosen the belting on the wheels; and interior prong means carried by said bars to contact the sides of the support wheels when passing same to maintain the belting in position on the wheels.

References Cited by the Examiner
UNITED STATES PATENTS

| | | | |
|---|---|---|---|
| 1,241,617 | 10/17 | Fuller et al. | 305—57 |
| 2,374,644 | 5/45 | Bombardier | 74—243 |
| 2,749,189 | 6/56 | France et al. | 305—35 |
| 2,925,873 | 2/60 | Laporte | 180—5 |
| 3,011,576 | 12/61 | Howes | 305—35 X |
| 3,057,219 | 10/62 | Montgomery | 74—243 |

FOREIGN PATENTS 539,809    9/41    Great Britain.

ARTHUR L. LA POINT, *Primary Examiner.*